United States Patent
Laake, Jr. et al.

(10) Patent No.: US 9,345,187 B2
(45) Date of Patent: May 24, 2016

(54) DOUBLE BLADED (OPPOSITE) COULTER ASSEMBLY

(71) Applicants: Richard Charles Laake, Jr., Haysville, KS (US); Martin Scott Ternes, Peck, KS (US); David Mathew Ternes, Peck, KS (US)

(72) Inventors: Richard Charles Laake, Jr., Haysville, KS (US); Martin Scott Ternes, Peck, KS (US); David Mathew Ternes, Peck, KS (US)

(*) Notice: Subject to any disclaimer, the term of this patent is extended or adjusted under 35 U.S.C. 154(b) by 0 days.

(21) Appl. No.: 13/652,535

(22) Filed: Oct. 16, 2012

(65) Prior Publication Data

US 2014/0102736 A1   Apr. 17, 2014

(51) Int. Cl.
| | |
|---|---|
| *A01B 5/00* | (2006.01) |
| *A01B 5/04* | (2006.01) |
| *A01B 13/00* | (2006.01) |
| *A01B 49/02* | (2006.01) |
| *A01C 5/06* | (2006.01) |
| *A01B 49/06* | (2006.01) |

(52) U.S. Cl.
CPC . *A01B 5/04* (2013.01); *A01B 13/00* (2013.01); *A01B 49/027* (2013.01); *A01C 5/064* (2013.01); *A01B 49/06* (2013.01)

(58) Field of Classification Search
CPC .............................. A01C 5/064; A01B 49/06
USPC .................................................. 172/166, 574
See application file for complete search history.

(56) References Cited

U.S. PATENT DOCUMENTS

| | | | | |
|---|---|---|---|---|
| 3,405,767 | A * | 10/1968 | Thompson | 172/572 |
| 3,529,676 | A * | 9/1970 | Moe et al. | 172/572 |
| 4,762,075 | A * | 8/1988 | Halford | 111/73 |
| 4,977,841 | A * | 12/1990 | Truax | 111/62 |
| 5,235,922 | A * | 8/1993 | Deckler | 111/137 |
| 5,279,236 | A * | 1/1994 | Truax | 111/139 |
| 5,573,072 | A * | 11/1996 | Evans et al. | 172/744 |
| 5,802,995 | A * | 9/1998 | Baugher et al. | 111/52 |
| 5,826,524 | A * | 10/1998 | Yoder | 111/194 |
| 6,102,132 | A * | 8/2000 | Schimke | 172/498 |
| 6,454,019 | B1 * | 9/2002 | Prairie | A01B 63/145 |
| | | | | 111/163 |
| 6,644,224 | B1 * | 11/2003 | Bassett | 111/157 |
| 7,481,171 | B2 * | 1/2009 | Martin | 111/121 |
| 7,669,536 | B2 * | 3/2010 | Martin | 111/52 |

* cited by examiner

*Primary Examiner* — Thomas B Will
*Assistant Examiner* — Joel F. Mitchell
(74) *Attorney, Agent, or Firm* — Cornelius P. Dukelow

(57) ABSTRACT

A double bladed (opposite) coulter assembly is provided. A second (opposite or mirrored) coulter blade is mounted on the same coulter assembly thereby equalizing the load realized by the equipment and eliminating the draft. The second (opposite or mirrored) coulter blade reduces wear on the coulter assembly and reduces the number of coulters required by one half per equivalent tool bar thereby increasing operational efficiency of the equipment.

8 Claims, 19 Drawing Sheets

DOUBLE BLADED (OPPOSITE) COULTER ASSEMBLY

CROSS-REFERENCE TO RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

N/A

BACKGROUND

Current coulters use a single blade for the application of fertilizer into the ground for the benefit of crops. The single blades are set at an angle of approximately 5 degrees from front to back thereby creating a draft of approximately 5 degrees. The draft caused by the angled blade reduces operational efficiency of the equipment and increases wear on the coulter assembly.

SUMMARY

A second (opposite or mirrored) coulter blade is mounted on the same coulter assembly thereby equalizing the load realized by the equipment and eliminating the draft. The second (opposite or mirrored) coulter blade reduces wear on the coulter assembly and reduces the number of coulters required by one half per equivalent tool bar thereby increasing operational efficiency of the equipment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
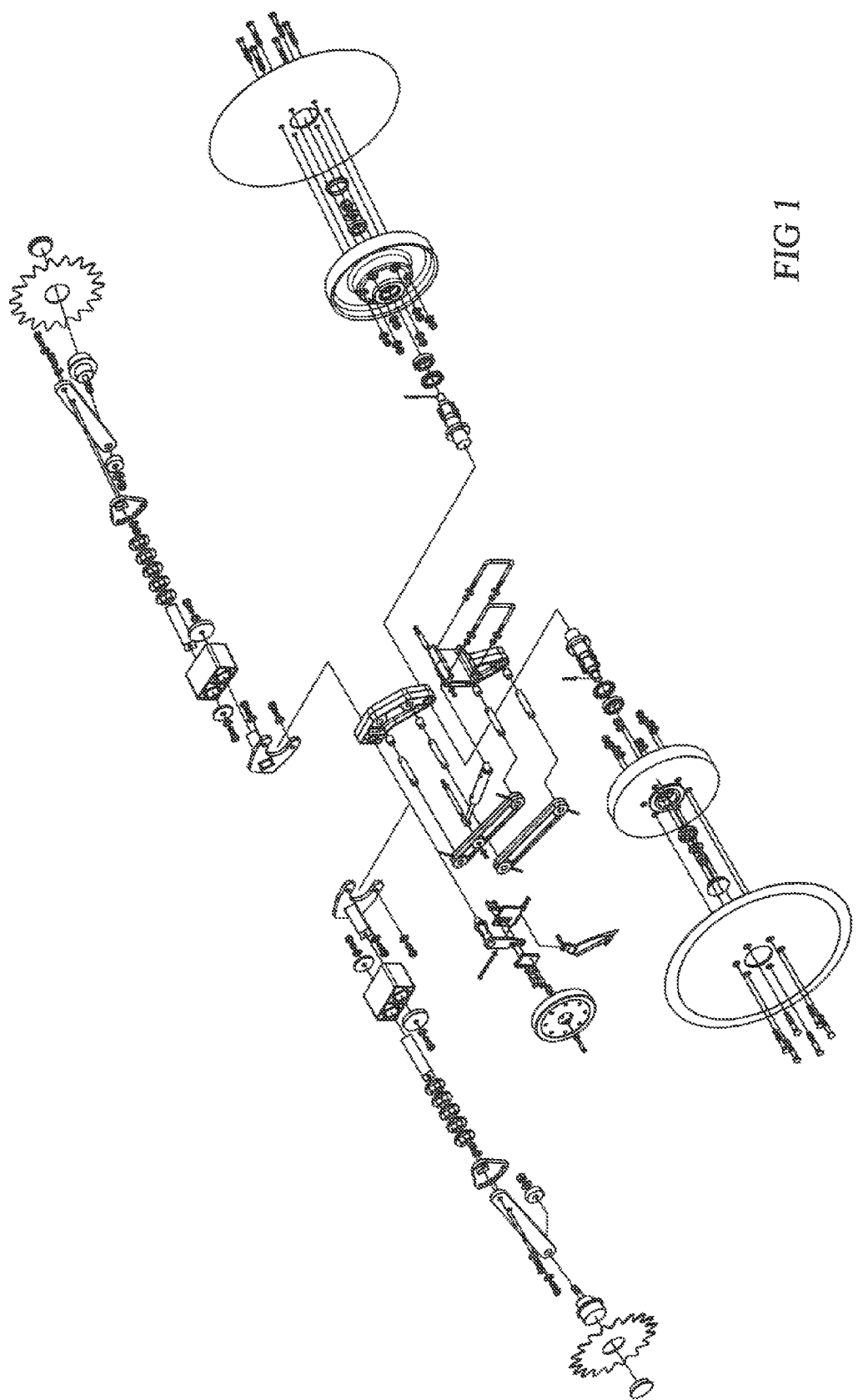
FIG. 1 illustrates an exploded view of the claimed subject matter and is not to be interpreted as limiting the scope thereof.

The embodiments discussed herein are merely illustrative of specific manners in which to make and use the claimed subject matter and are not to be interpreted as limiting the scope thereof.

Figure 2:
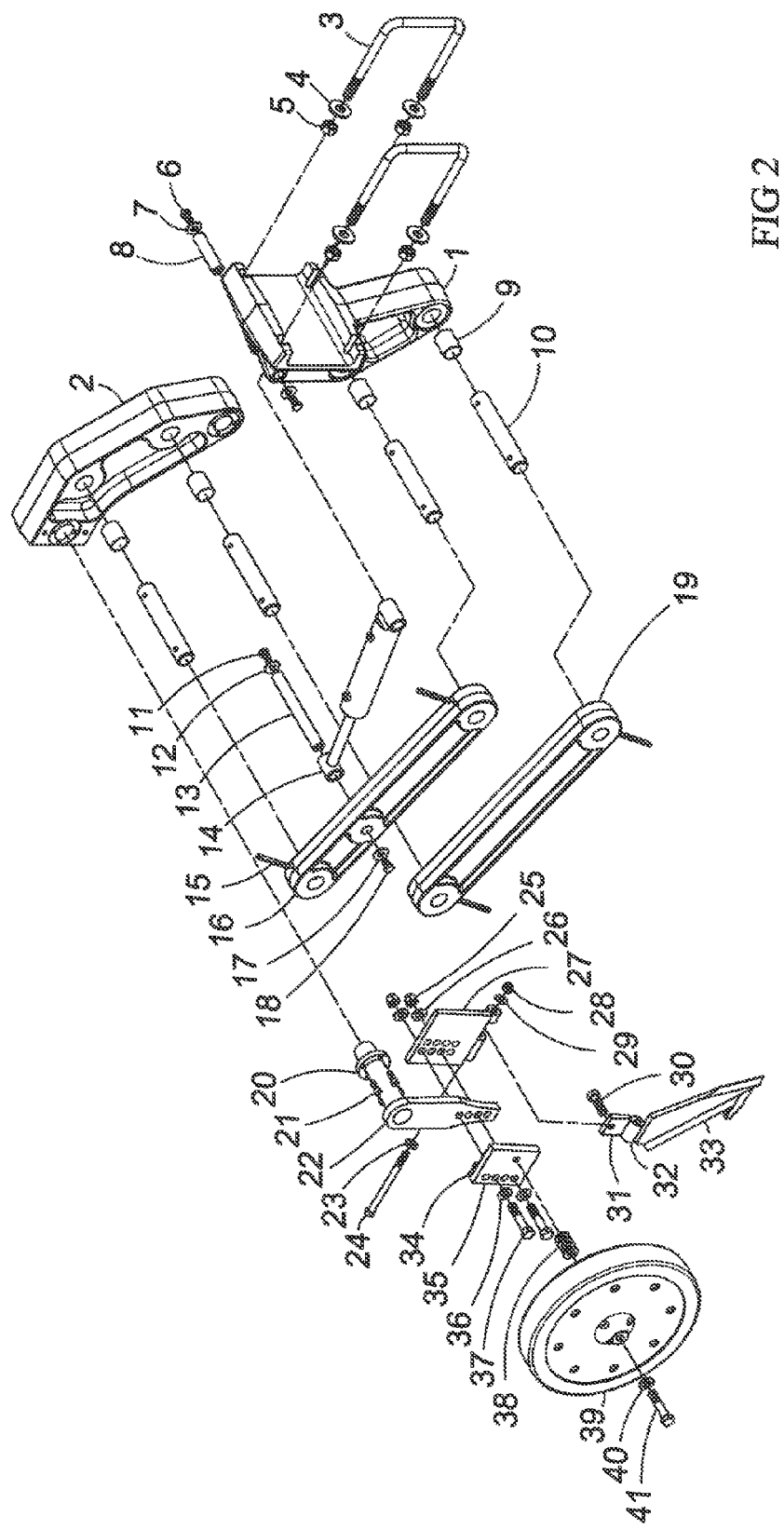
FIG. 2 illustrates an exploded view of the Main Body Assembly (right side) of the claimed subject matter and is not to be interpreted as limiting the scope thereof.

Referring to the drawings in detail:

FIG. 2 illustrates an exploded view of the Main Body Assembly (right side only) of the claimed subject matter. The Main Body Assembly is securely connected to a pulling implement via the Attachment Fitting [1] coupling with the pulling implement and maintained securely via two U-Bolts [3]. The Attachment Fitting [1] is preferably cast of ductile iron, precision machined to "lock" onto the tool bar to keep the assembly from moving, especially pitching, from the variation of loads from one coulter blade to the other. As illustrated, the U-Bolts [3] are secured to the Attachment Fitting [1] via a Washer [4] and Nut [5] combination. Two Upper Links [16] are coupled with the Attachment Fitting [1] via a Bushings [9] and Pivot Pins [10] extending therefrom to couple with the Body Fitting [2], via a Bushings [9] and Pivot Pins [10]. The Body Fitting [2] is cast from ductile iron and precision machined for attachment of the right and left depth wheel assemblies, right and left closing wheel assemblies. The assembly as a whole can move up and down with the ground contour and the parallel links keep the unit perpendicular to the tool bar. The Pivot Pins [10] are securely coupled with the Upper Links [16] via Roll Pins [15]. Two Lower Links [19] are also coupled with the Attachment Fitting [1] via a Bushings [9] and Pivot Pins [10] extending therefrom to couple with the Body Fitting [2], via a Bushings [9] and Pivot Pins [10]. The Pivot Pins [10] are securely coupled with the Lower Links [19] via Roll Pins [15]. The Upper Links [16] are further coupled with the Attachment Fitting [1] via a Hydraulic Cylinder [14], which is coupled with the Upper Links [16] via a Cylinder Pin [13] held by Washer [12 & 17] and Bolt [11 & 18] combinations. The Hydraulic Cylinder [14] is coupled with the Attachment Fitting [1] via a Cylinder Pin [8] held by Washer [7] and Bolt [6] combinations. The Hydraulic Cylinder [14] provides the down pressure force to the Right and Left Depth Wheel Assemblies from the Attachment Fitting [1] through the Body Fitting [2] to ensuring the coulter blades are at maximum depth. Downward force is adjustable for various soil conditions. These cylinders also provide the movement of lifting the coulter assemblies up and out of the ground for repositioning in the field or transporting. The Upper Links [16] and Lower Links [19] are cast ductile iron, precision machined for the pivot pins [10]. The Upper Links [16] and Lower Links [19] work in unison to ensure the Right and Left Depth Wheel Assemblies move upwards and downwards without any side to side or twisting motion.

Wing Spools [20] are secured to the Body Fitting [2] by Bolts [21]. The Wing Spools [20] provide the stand-off and support structures for the Right and Left Depth Wheel Assemblies. Paddles [22] mate with and extend from the Wing Spools [20]. Knife Height Adjustment Plates [27] and Cleaning Wheel Adjustment Plates [35] are coupled with the Paddles [22] via Bolts [37], Washers [26 & 36], Lock Nuts [25], and Spacer [34] combination. The Knife Height Adjustment Plates [27] adjust the Cleaning Wheels [39] and the Knife Assemblies [33] forward & aft and up & down. Knife Assemblies [33] are mounted on the Knife Height Adjustment Plates [27] via Pivot Tubes [32] in combination with Pivot Bolts [24] maintained by Washers [23 & 29] and Nuts [28]. The knives are placed alongside the Coulter Blades [54 & 68] to support and protect fertilizer applicator tubes from damage from running in the ground. Coulter Blades [54 & 68] are hardened blades that cut the slot in the ground for placement of fertilizer. Coulter Blades [54 & 68] come in various thickness and diameters and wear with usage.

Tabs [31] extending from the Pivot Tubes [32] of the Knife Assemblies [33] and Bolts [30] further secure the coupling between the Knife Height Adjustment Plates [27] and Knife Assemblies [33]. Cleaning Wheels [39] are coupled with the Cleaning Wheel Adjustment Plates [35] via Washer [40] and Bolt [41] combinations and space is created between the Cleaning Wheels [39] and the Cleaning Wheel Adjustment Plates [35] via Spacers [38]. The Cleaning Wheel Adjustment Plates [35] provide a means to adjust the Cleaning Wheels [39] up or downward to control the lifting of soil created by the Coulter Blades [54 & 68]. Cleaning Wheels [39] clean the Coulter Blades [54 & 68] and provides mechanisms for containing the disturbed soil from the Coulter Blades [54 & 68] by giving the raised soil a stop from being pulled completely from the ground.

Figure 3:
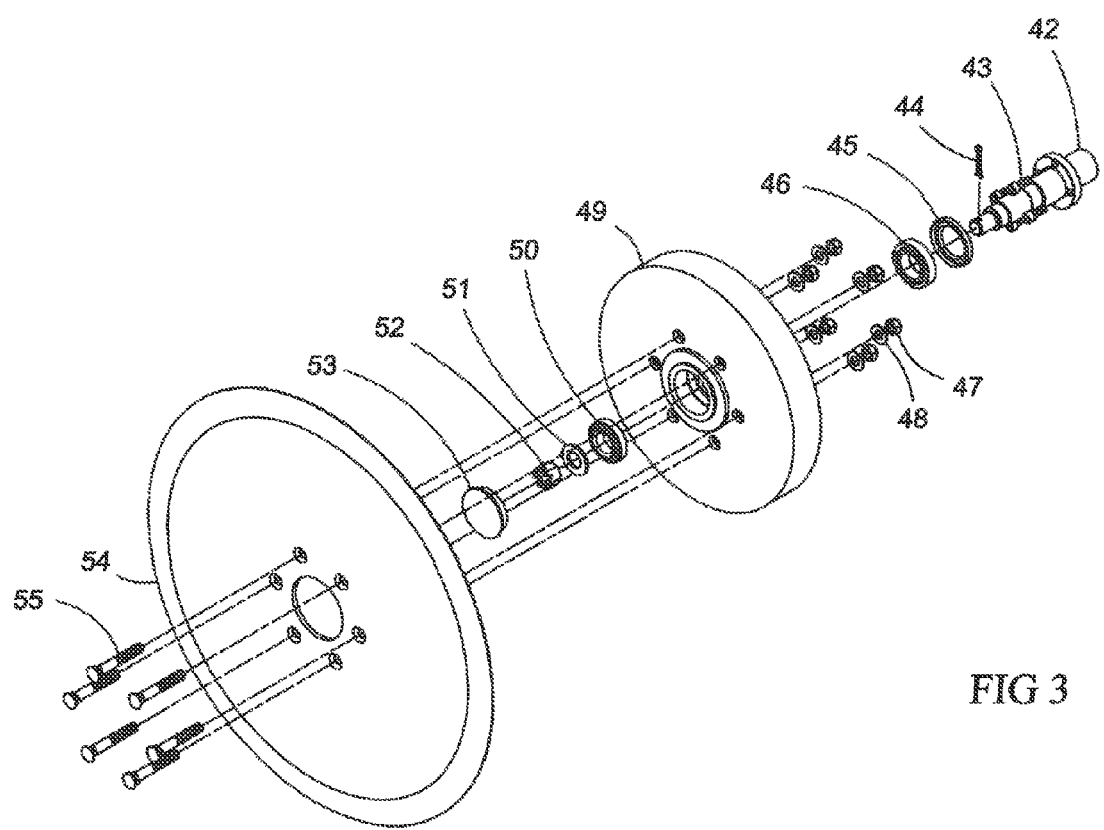
FIG. 3 illustrates an exploded view of the Right Depth Wheel Assembly of the claimed subject matter and is not to be interpreted as limiting the scope thereof.
Figure 4:
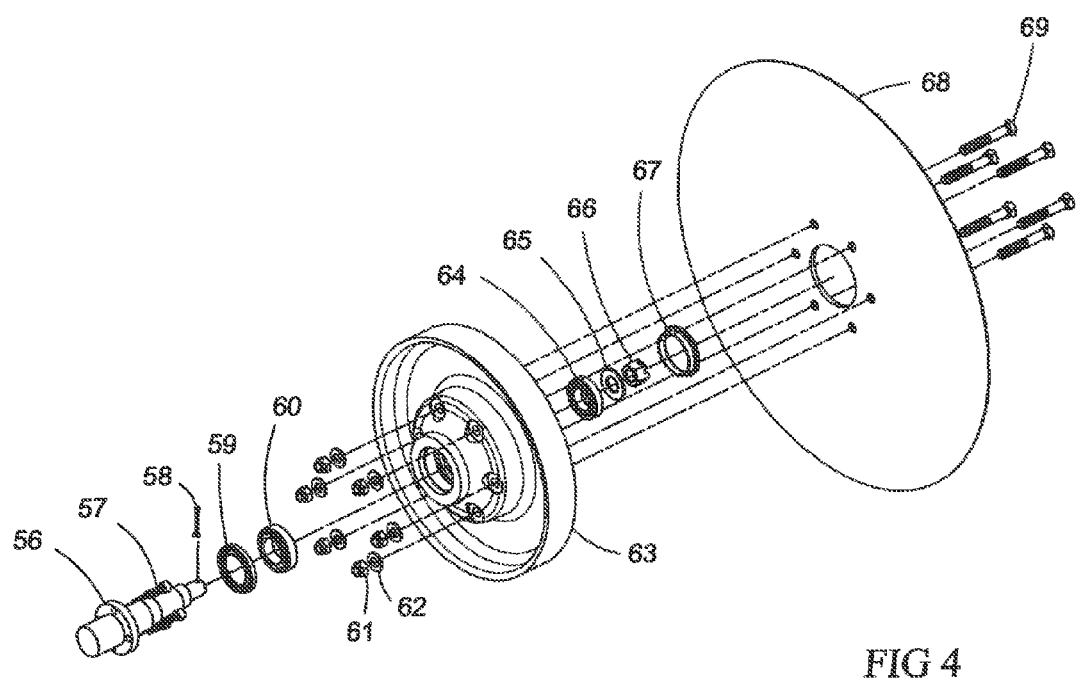
FIG. 4 illustrates an exploded view of the Left Depth Wheel Assembly of the claimed subject matter and is not to be interpreted as limiting the scope thereof.

FIG. 3 and FIG. 4 illustrate exploded views of the Right and Left Depth Wheel Assemblies of the claimed subject matter. Axles [42 & 56] are secured to the Body Fitting [2] by Bolts [43 & 57]. Depth Wheel Gauges/Hubs [49 & 63] with Bearings [46 & 50 and 60 & 64] and Axle Seal [45 & 59] are coupled to the Axles [42 & 56] by Washer [51 & 65], Cotter Pin [44 & 58], and Castle Nut [52 & 66] combinations.

Hub Caps [53 & 67] cover the Washer [51 & 65], Cotter Pin [44 & 58], and Castle Nut [52 & 66] coupling combinations. Coulter Blades [54 & 68] are secured to the Depth Wheel Gauges/Hubs [49 & 63] via Plow Bolts [55 & 69], Washers [48 & 62], and Lock Nuts [47 & 61]. The Depth Wheel Gauges/Hubs [49 & 63] set the depth of Coulter Blades [54 & 68] in the ground. The Depth Wheel Gauges/Hubs [49 & 63] ride on undisturbed soil for precision depth placement. The Hydraulic Cylinder [14] provides the pressure to ensure the Depth Wheel Gauges/Hubs [49 & 63] are pushed to the surface of the soil for precision placement of applied fertilizer depth. Depth Wheel Gauges/Hubs [49 & 63] are cast ductile iron precision machined and drilled and counter bored for fastening of the Coulter Blades [54 & 68].

Figure 5:
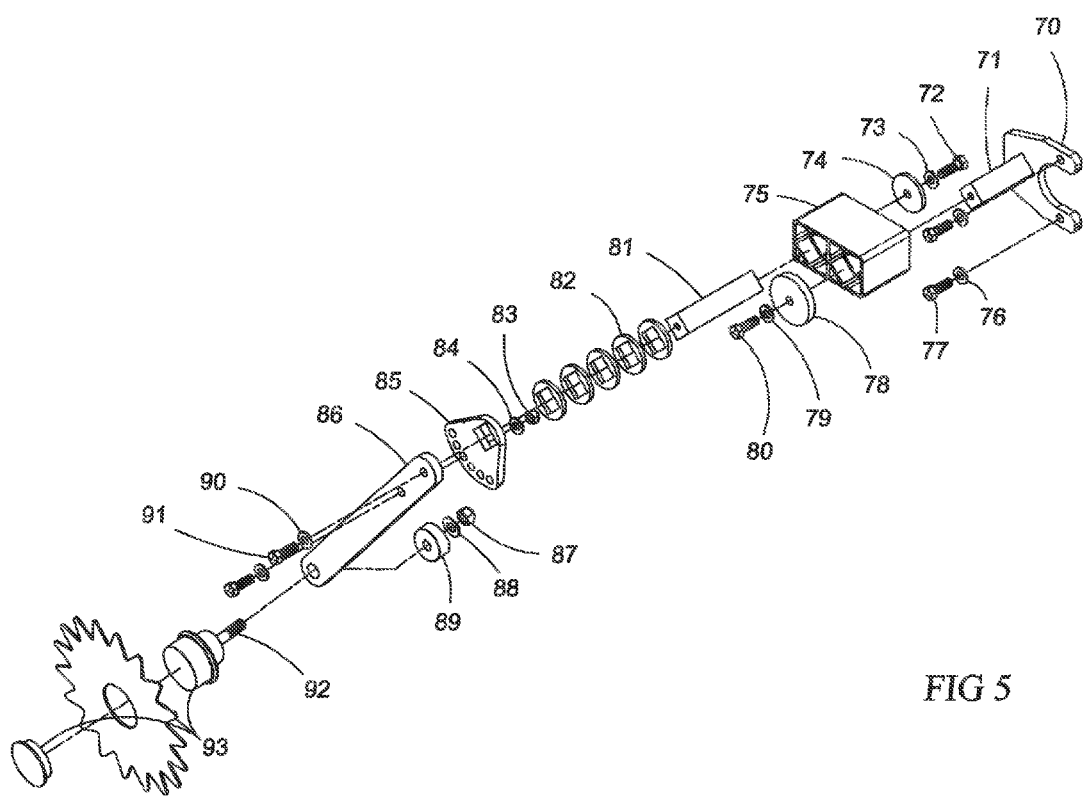
FIG. 5 illustrates an exploded view of the Right Closing Wheel Assembly of the claimed subject matter and is not to be interpreted as limiting the scope thereof.
Figure 6:
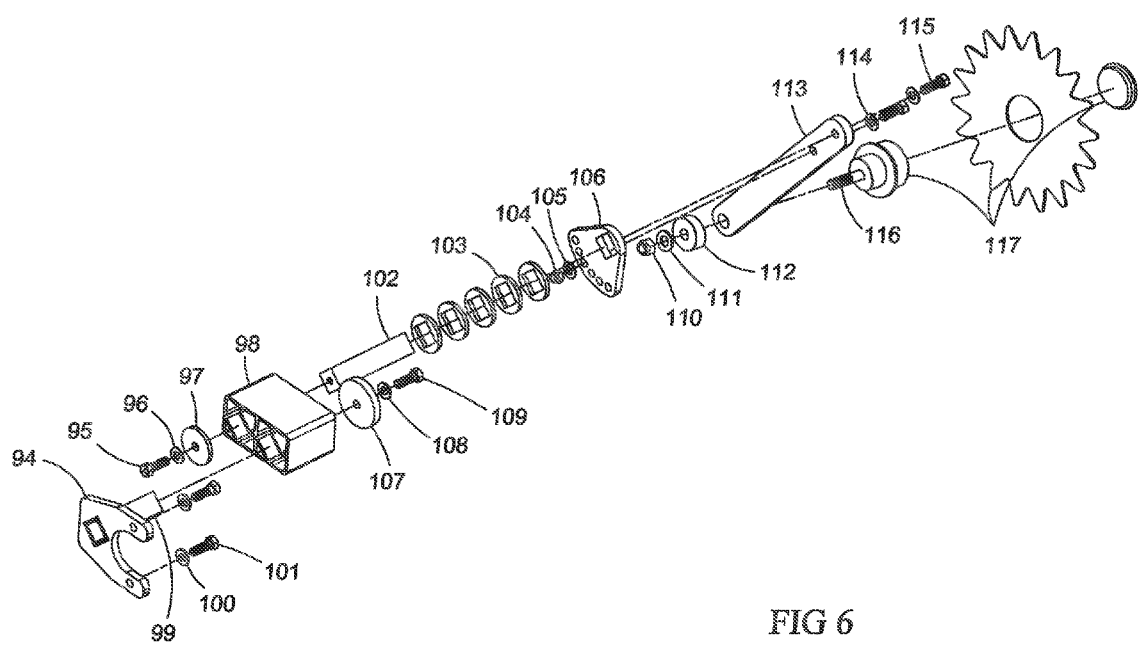
FIG. 6 illustrates an exploded view of the Left Closing Wheel Assembly of the claimed subject matter and is not to be interpreted as limiting the scope thereof.
Figure 7:
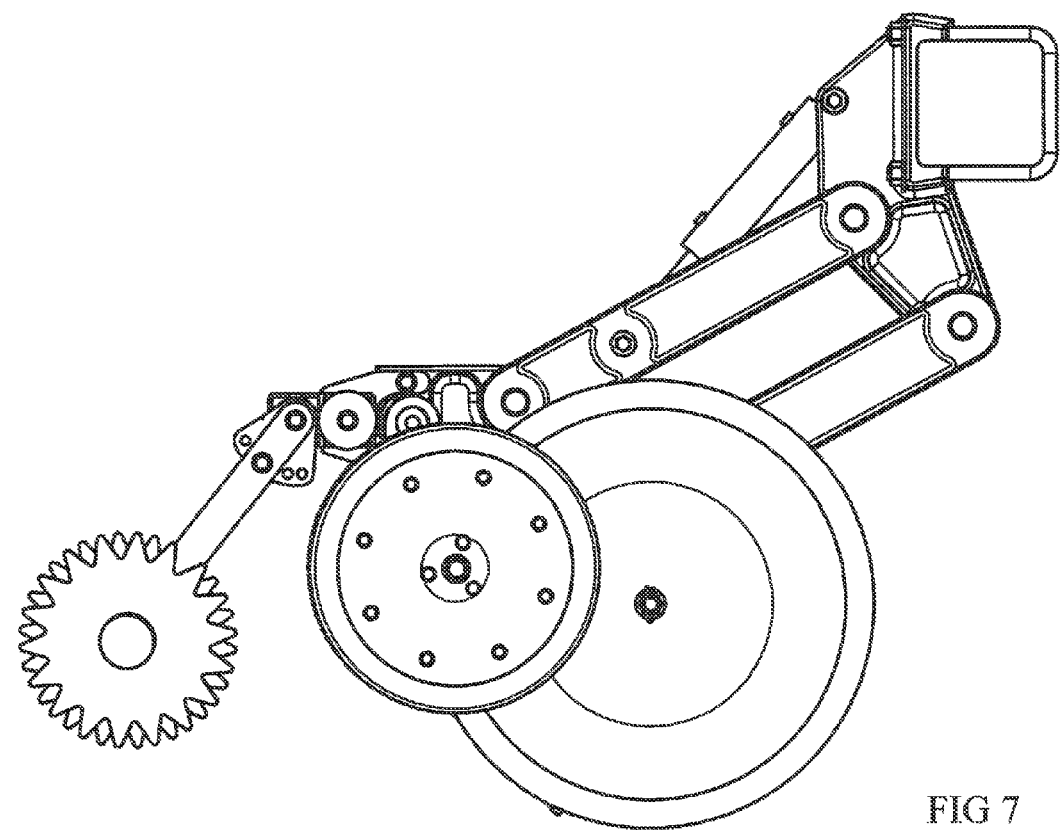
FIG. 7 illustrates a perspective view of the claimed subject matter and is not to be interpreted as limiting the scope thereof.
Figure 8:
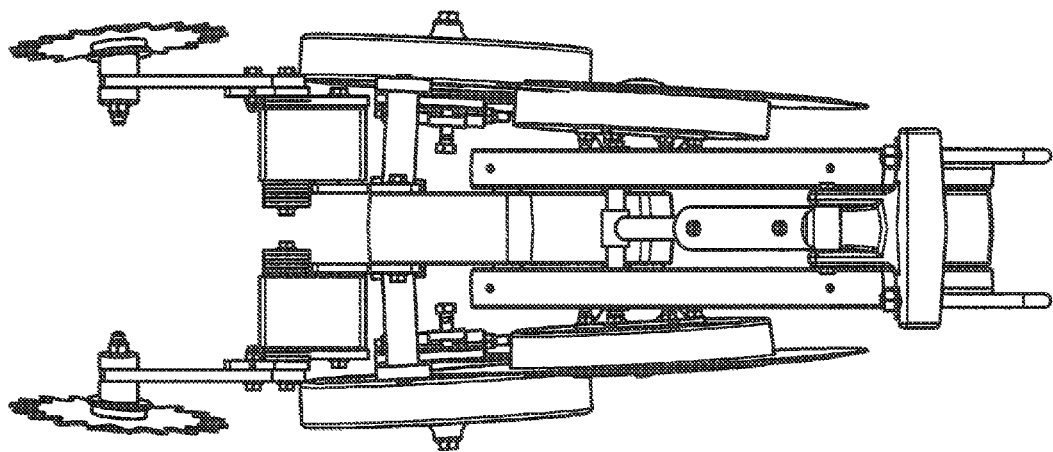
FIG. 8 illustrates a perspective view of the claimed subject matter and is not to be interpreted as limiting the scope thereof.
Figure 9:
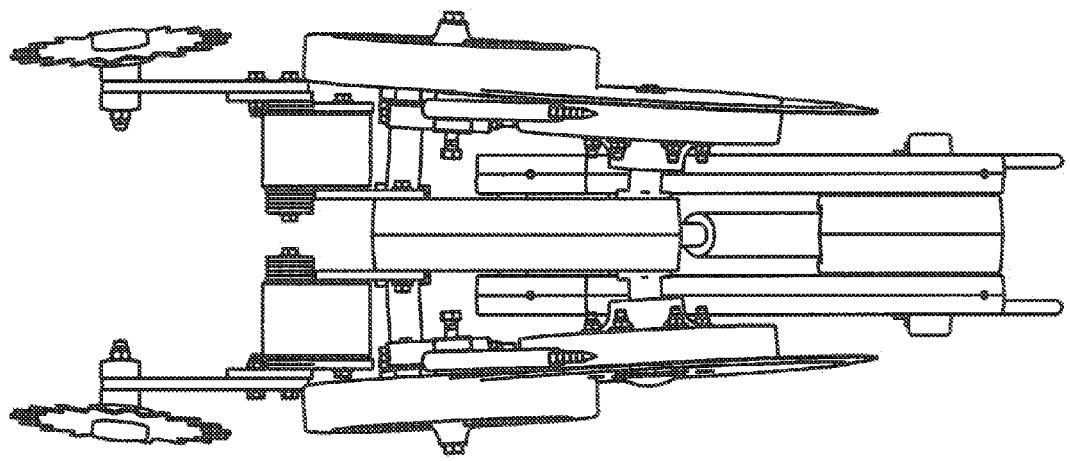
FIG. 9 illustrates a perspective view of the claimed subject matter and is not to be interpreted as limiting the scope thereof.
Figure 10:
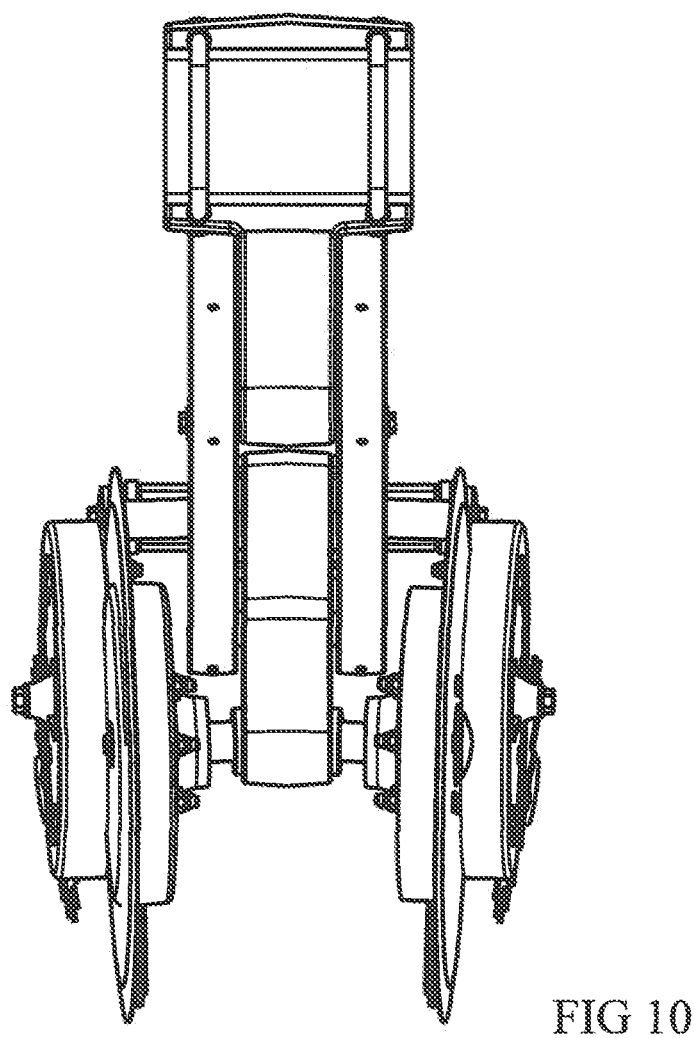
FIG. 10 illustrates a perspective view of the claimed subject matter and is not to be interpreted as limiting the scope thereof.
Figure 11:
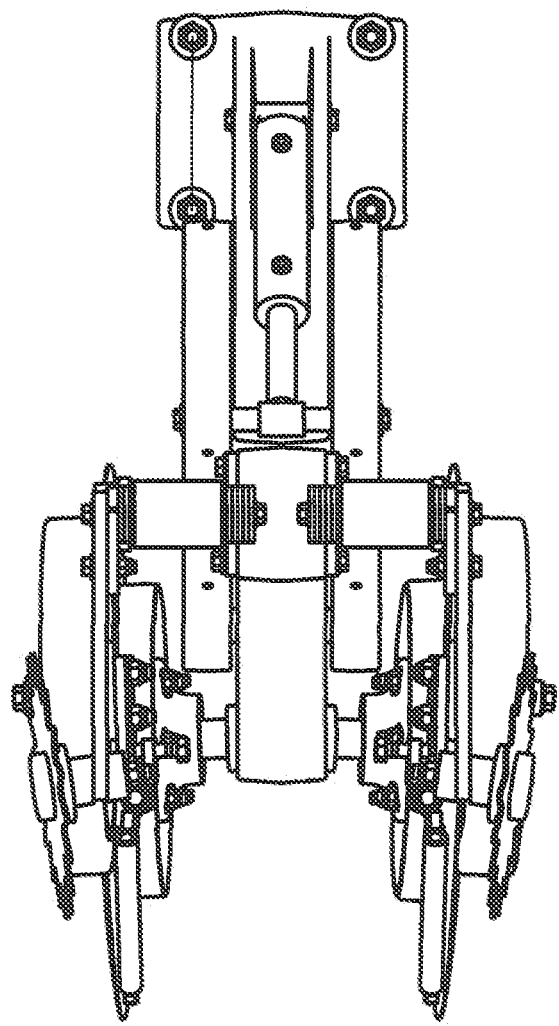
FIG. 11 illustrates a perspective view of the claimed subject matter and is not to be interpreted as limiting the scope thereof.
Figure 12:
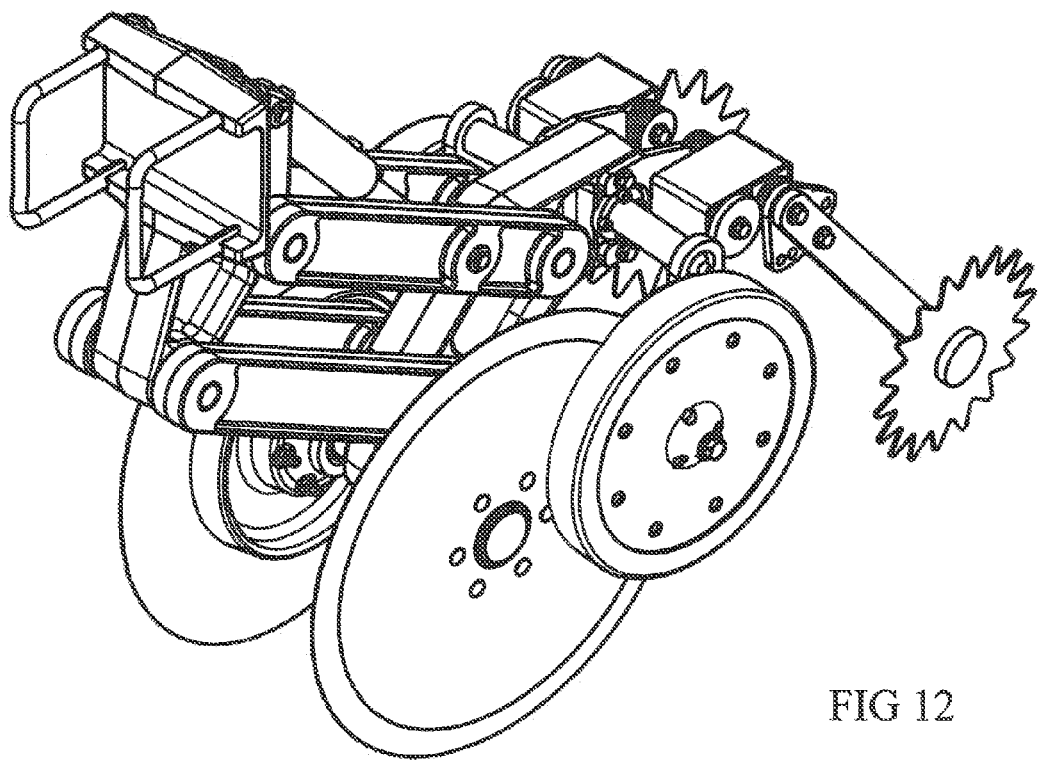
FIG. 12 illustrates an isometric view of the claimed subject matter and is not to be interpreted as limiting the scope thereof.
Figure 13:
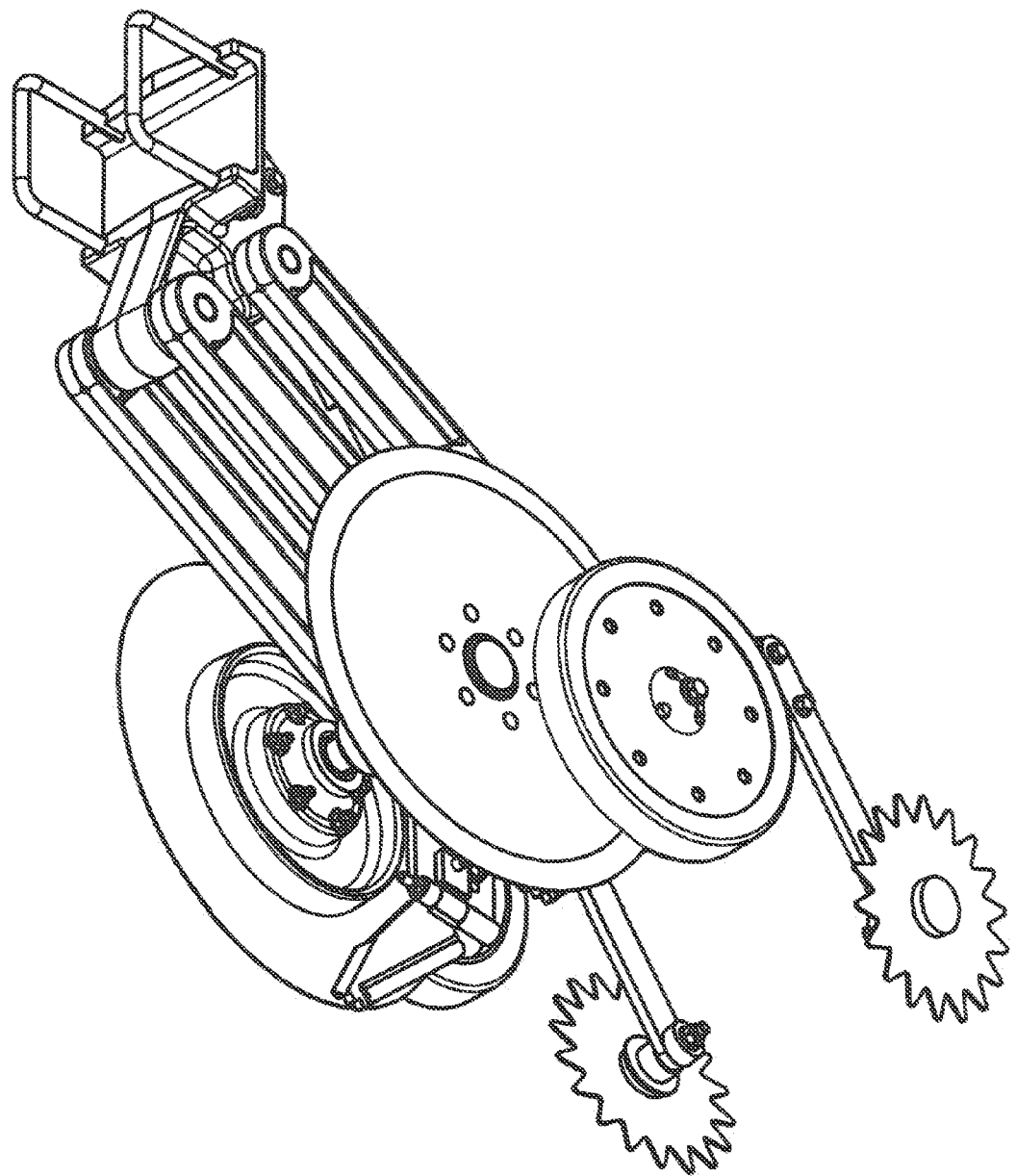
FIG. 13 illustrates an isometric view of the claimed subject matter and is not to be interpreted as limiting the scope thereof.
Figure 14:
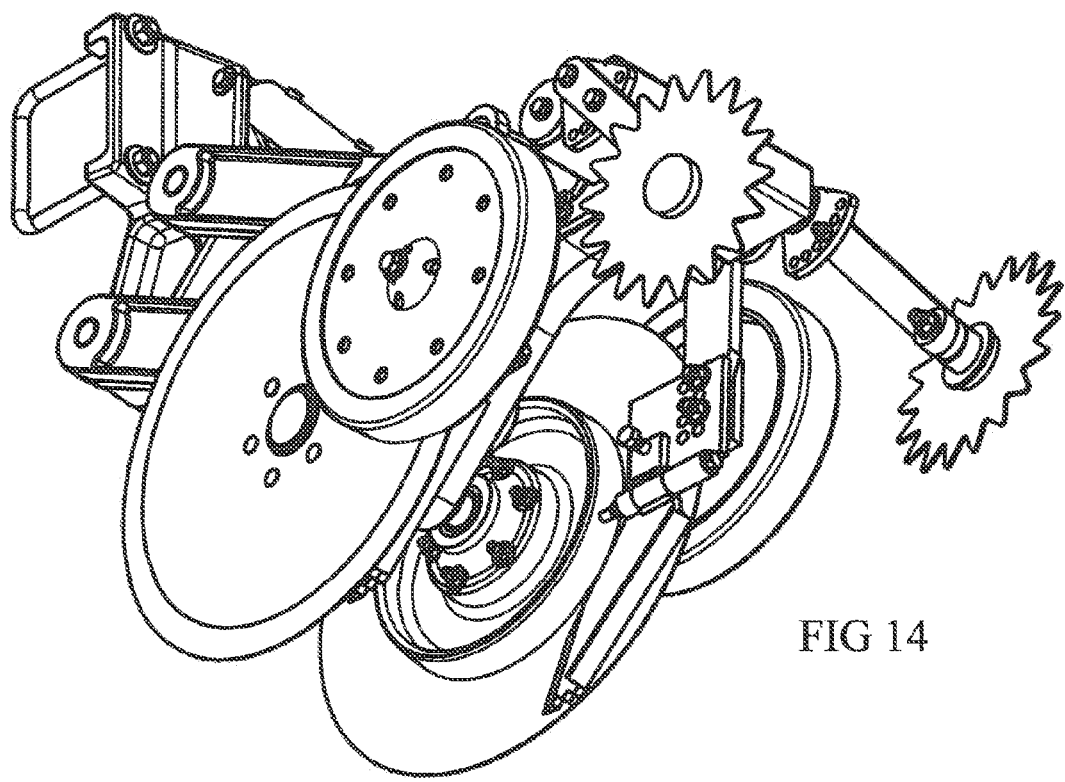
FIG. 14 illustrates an isometric view of the claimed subject matter and is not to be interpreted as limiting the scope thereof.
Figure 15:
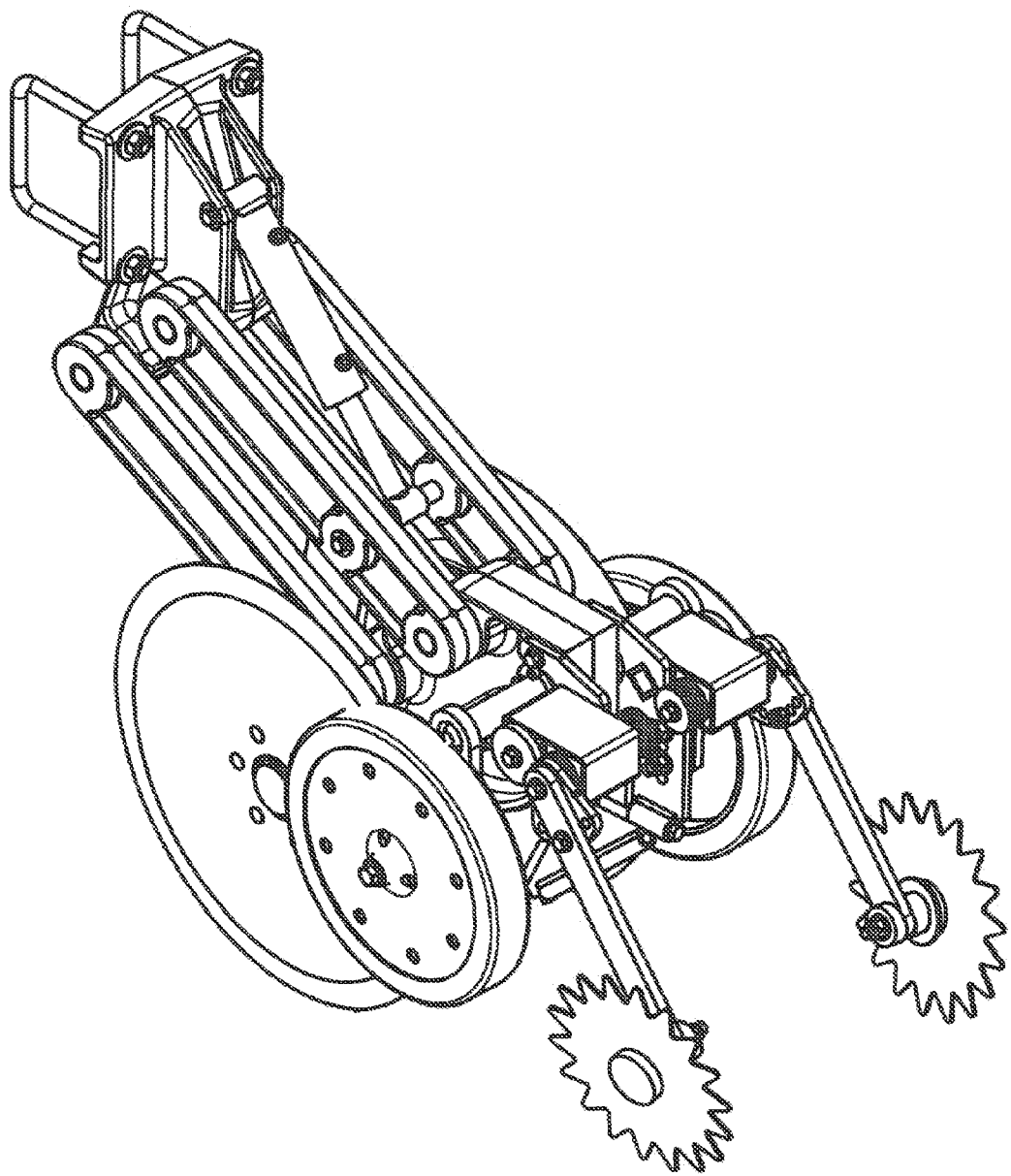
FIG. 15 illustrates an isometric view of the claimed subject matter and is not to be interpreted as limiting the scope thereof.
Figure 16:
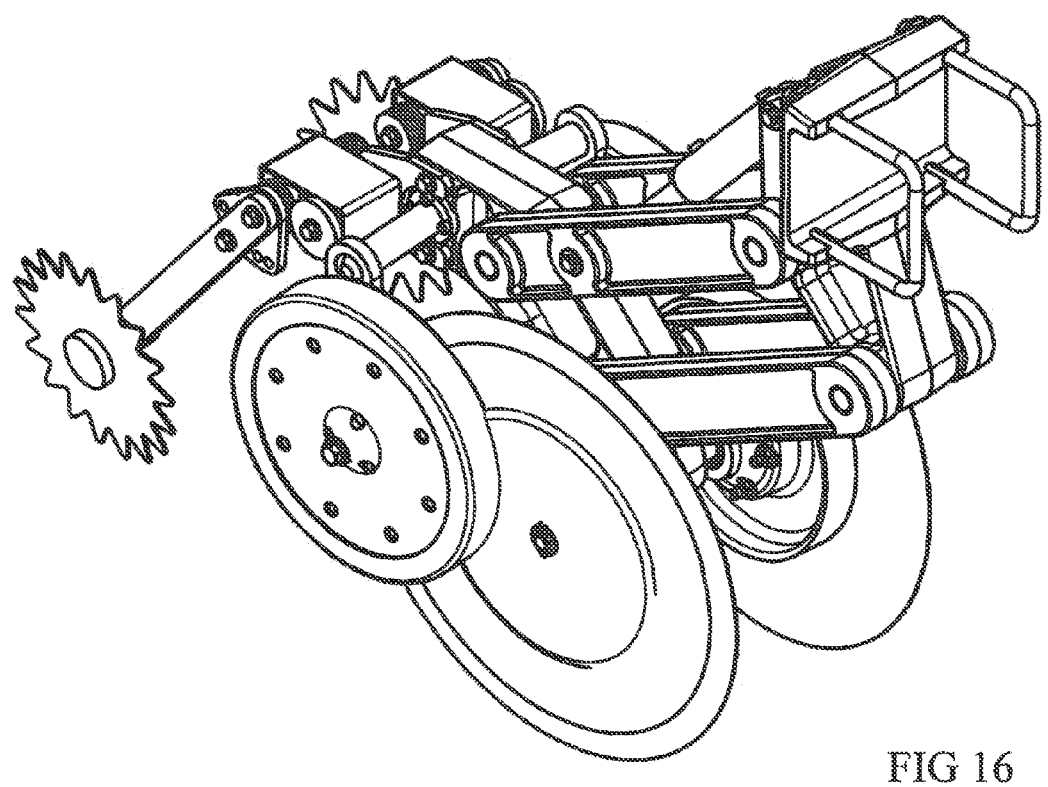
FIG. 16 illustrates an isometric view of the claimed subject matter and is not to be interpreted as limiting the scope thereof.
Figure 17:
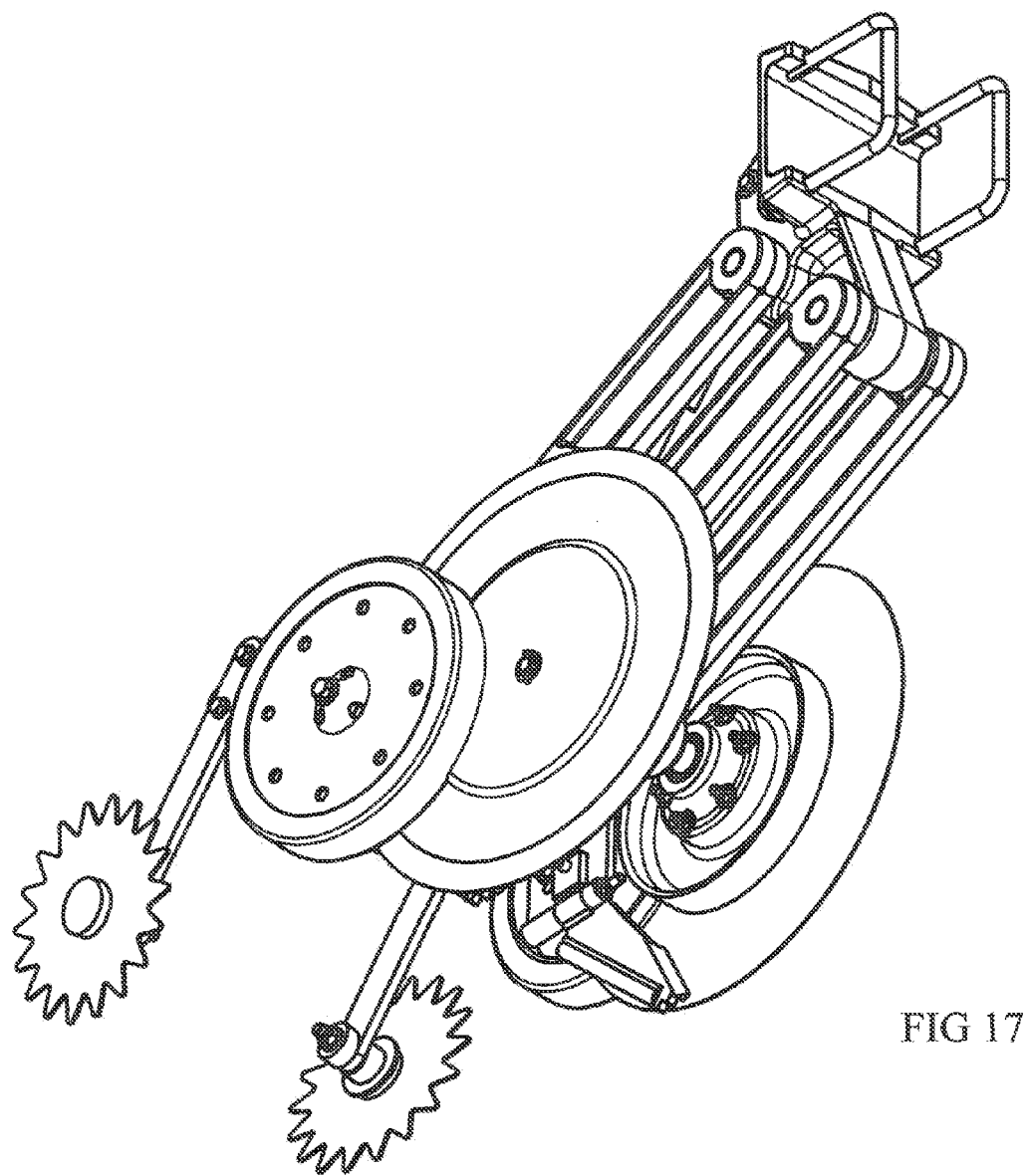
FIG. 17 illustrates an isometric view of the claimed subject matter and is not to be interpreted as limiting the scope thereof.
Figure 18:
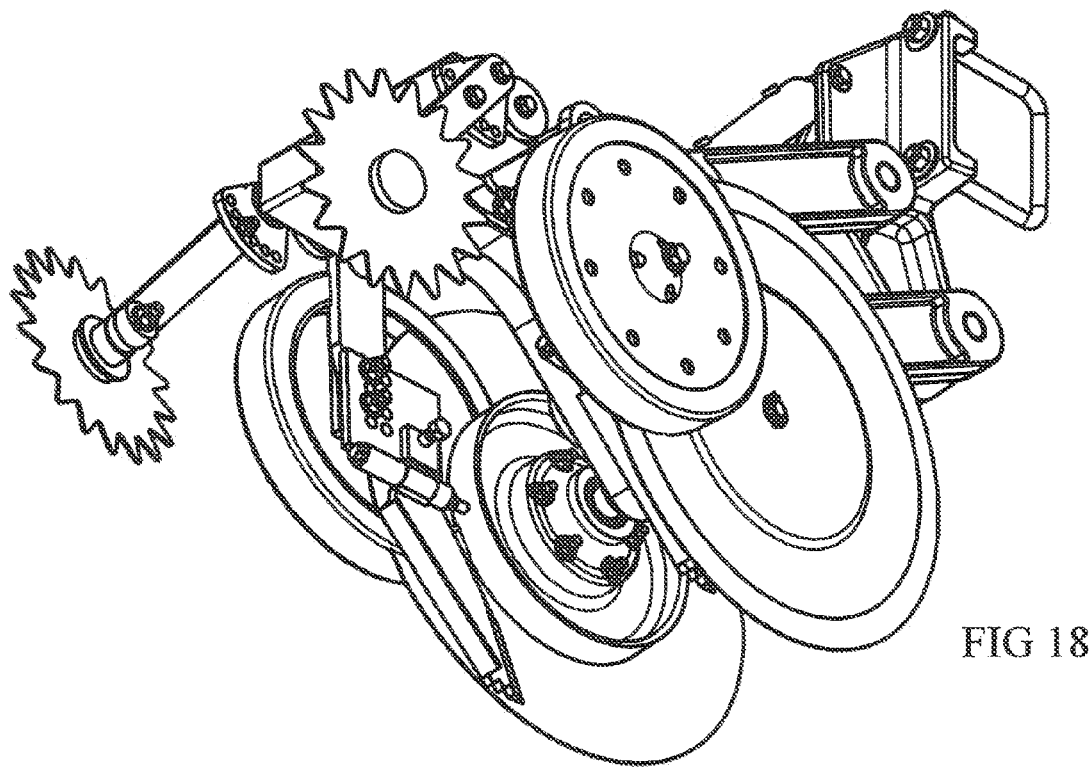
FIG. 18 illustrates an isometric view of the claimed subject matter and is not to be interpreted as limiting the scope thereof.
Figure 19:
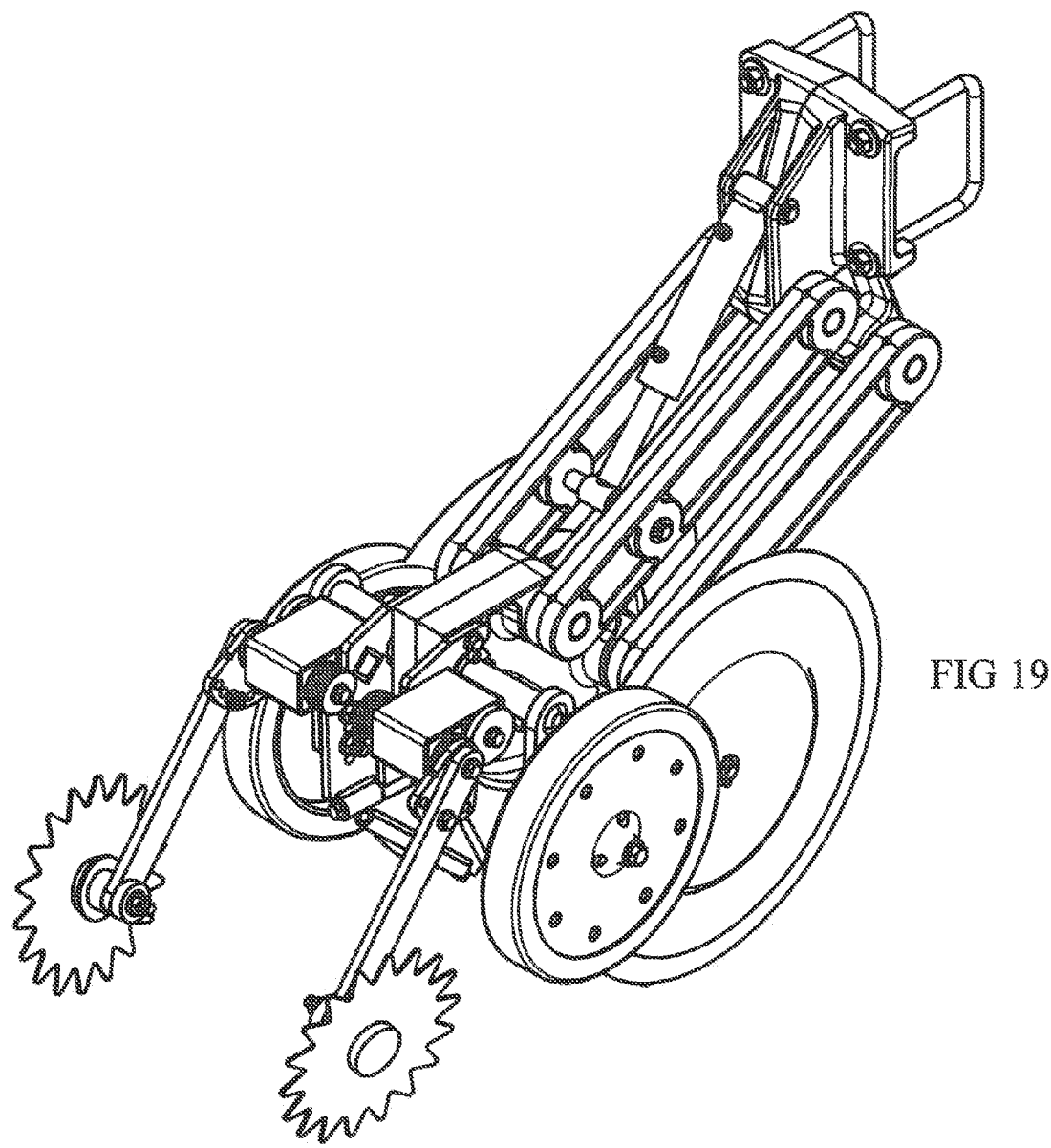
FIG. 19 illustrates an isometric view of the claimed subject matter and is not to be interpreted as limiting the scope thereof.

FIG. 5 and FIG. 6 illustrate exploded views of the Right and Left Closing Wheel Assemblies of the claimed subject matter. Wing Brackets [70 & 94], with Isolator Bars Short [71 & 99] extending therefrom, are secured to the Body Fitting [2] by Washer [76 & 100] and Bolt [77 & 101] combinations. Torsion Isolator [75 & 98] are mated with the Isolator Bars Short [71 & 99] and maintained thereon via Cap [78 & 107], Washer [79 & 108], and Bolt [80 & 109] combinations. Torsion Isolator [75 & 98] prove adjustable down pressure to the Right and Left Closing Wheel Assemblies. Torsion Isolator [75 & 98] allow the Right and Left Closing Wheel Assemblies to work independent of the Main Body Assembly and each other.

Pressure is adjustable by Pressure Plates [85 & 106] and pressure is set to effectively close the slot made by the Coulter Blades [54 & 68] with minimal disturbance to the soil. Isolator Bars Long [81] are mated with Torsion Isolator [75 & 98] and maintained therein via Cap [74 & 107], Washer [73 & 108], and Bolt [72 & 109] combinations. Pressure Plates [85 & 106] are mated with Isolator Bars Long [81 & 102] and separated from Torsion Isolator [75 & 98] via Spacers [82 & 103]. Pressure Plates [85 & 106] provide means to adjust the downward pressure on the Right and Left Closing Wheel Assemblies. Links [86 & 113] are secured to Isolator Bars Long [81 & 102] via Washer [90 & 114] and Bolt [91 & 115] combinations and further secured to Pressure Plates [85 & 106] via Washer [90 & 114] and Bolt [91 & 115] and Washer [84 & 105] and Lock Nut [83 & 104] combinations.

Closing Wheel Assemblies [93 & 117], which include bolt assemblages, notched closing wheels and caps, are mated with Links [86 & 113] and maintained thereon via Bolts [92 & 116], Eccentric Cam Sets [89 & 112], Washers [88 & 111], and Lock Nuts [87 & 110]. Links [86 & 113] support the Closing Wheel Assemblies [93 & 117] for placement of the Closing Wheel Assemblies [93 & 117] in relationship to the slot cut made by the Coulter Blades [54 & 68] with minimal disturbance to the soil. Closing Wheel Assemblies [93 & 117] provide the mechanism to close the slot made by the Coulter Blades [54 & 68] with minimal disturbance to the soil. Closing Wheel Assemblies [93 & 117] come in different configurations dependent upon soil conditions and aggressiveness of soil disturbance.

While the claimed subject matter has been described with a certain degree of particularity, it is to be noted that modifications may be made in the details of the claimed subject matter's construction and the arrangement of its components without departing from the spirit and scope of this disclosure. It is understood that the claimed subject matter is not limited to the embodiments set forth herein for the purposes of exemplification.

The invention claimed is:

1. A bilaterally symmetric coulter assembly, comprising:
   a. a support assembly with a left side and a mirrored right side;
   b. a left axle coupled to the left side of the support assembly;
   c. a right axle coupled to the right side of the support assembly;
   d. a left depth wheel coupled to the left axle;
   e. a right depth wheel coupled to the right axle;
   f. a left coulter blade directly coupled to the left depth wheel;
   g. a right coulter blade directly coupled to the right depth wheel;
   h. a left multi-chambered torsion isolator receptive of multiple isolator bars coupled to the left side of the support assembly;
   i. a right multi-chambered torsion isolator receptive of multiple isolator bars coupled to the right side of the support assembly; and
   j. means for urging the coulter blades into ground.

2. The bilaterally symmetric coulter assembly of claim 1, further comprising:
   a. a left cleaning wheel coupled to the left side of the support assembly; and
   b. a right cleaning wheel coupled to the right side of the support assembly.

3. The bilaterally symmetric coulter assembly of claim 1, further comprising:
   a. a left closing wheel coupled to the left side of the support assembly; and
   b. a right closing wheel coupled to the right side of the support assembly.

4. The bilaterally symmetric coulter assembly of claim 2, further comprising:
   a. a left knife assembly coupled to the left cleaning wheel; and
   b. a right knife assembly coupled to the right cleaning wheel.

5. The bilaterally symmetric coulter assembly of claim 2, further comprising:
   a. means to independently adjust the position of the cleaning wheels.

6. The bilaterally symmetric coulter assembly of claim 3, further comprising:
   a. means to independently adjust the position of the closing wheels.

7. The bilaterally symmetric coulter assembly of claim 4, further comprising:
   a. means to independently adjust the position of the knife assemblies.

8. A bilaterally symmetric coulter assembly, comprising:
   a. a support assembly with a left side and a mirrored right side;
   b. a left axle coupled to the left side of the support assembly;
   c. a right axle coupled to the right side of the support assembly;
   d. a left depth wheel coupled to the left axle;
   e. a right depth wheel coupled to the right axle;
   f. a left coulter blade directly coupled to the left depth wheel;
   g. a right coulter blade directly coupled to the right depth wheel;
   h. a left multi-chambered torsion isolator receptive of multiple isolator bars coupled to the left side of the support assembly;
   i. a right multi-chambered torsion isolator receptive of multiple isolator bars coupled to the right side of the support assembly;
   j. means for urging the coulter blades into ground;
   k. a left cleaning wheel coupled to the left side of the support assembly;
   l. a right cleaning wheel coupled to the right side of the support assembly;
   m. means to independently adjust the position of the cleaning wheels;
   n. a left closing wheel coupled to the left side of the support assembly;
   o. a right closing wheel coupled to the right side of the support assembly;
   p. means to independently adjust the position of the closing wheels;
   q. a left knife assembly coupled to the left cleaning wheel;
   r. a right knife assembly coupled to the right cleaning wheel; and
   s. means to independently adjust the position of the knife assemblies.

* * * * *